Figure 1:
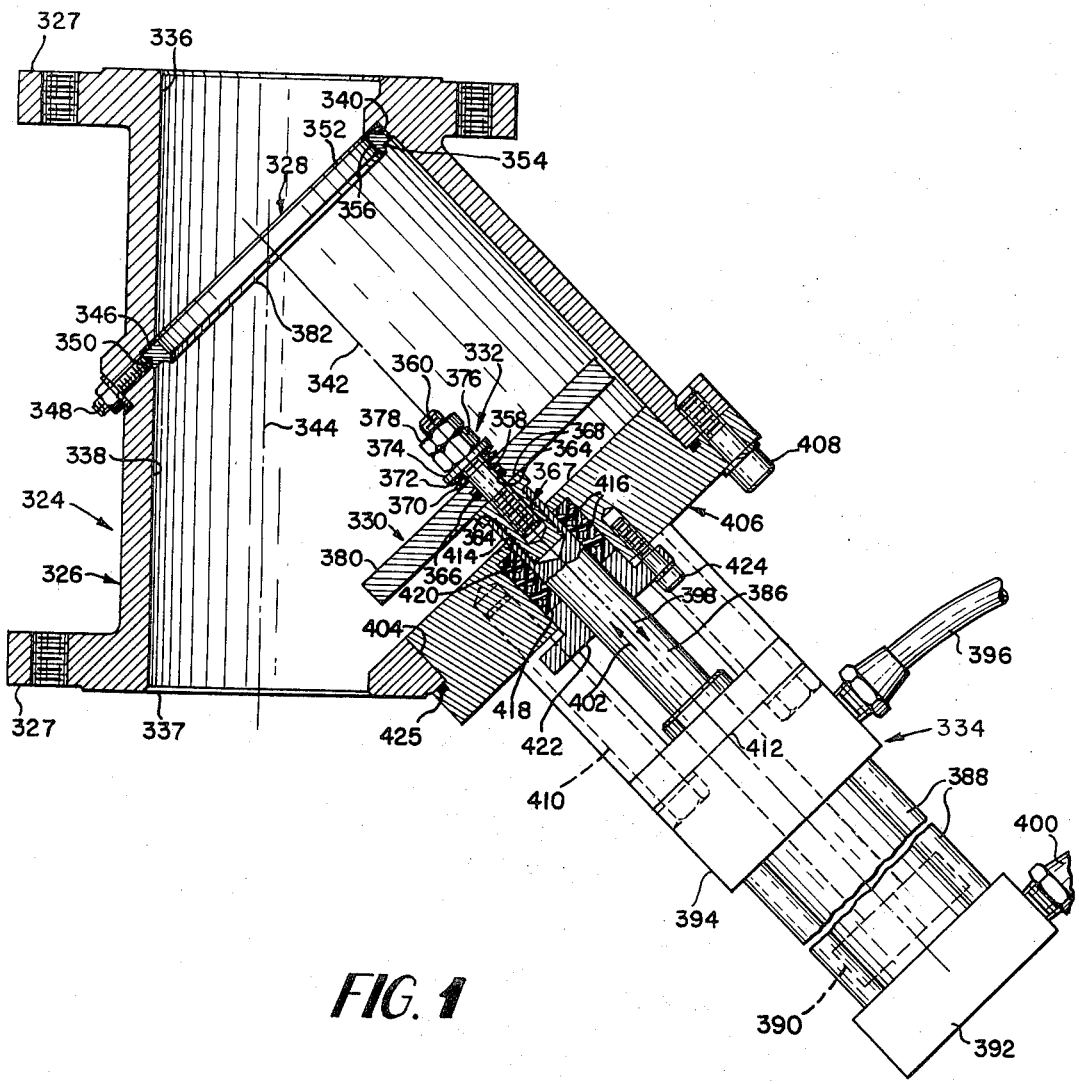

United States Patent [19]
Smith, Jr.

[11] 3,825,221
[45] July 23, 1974

[54] VALVES FOR ROASTING APPARATUS AND OTHER APPLICATIONS

[75] Inventor: Horace L. Smith, Jr., Richmond, Va.

[73] Assignee: Smitherm Industries, Inc., Richmond, Va.

[22] Filed: May 22, 1973

[21] Appl. No.: 362,824

Related U.S. Application Data

[62] Division of Ser. No. 301,977, Oct. 30, 1972, Pat. No. 3,763,766.

[52] U.S. Cl............ 251/62, 251/84, 251/85, 251/214, 251/363
[51] Int. Cl............................................ F16k 31/43
[58] Field of Search............... 251/62–63.6, 251/84–88, 333, 329, 357, 363, 214

[56] References Cited
UNITED STATES PATENTS

| | | | |
|---|---|---|---|
| 2,088,102 | 7/1937 | Williams | 251/357 |
| 2,696,361 | 12/1954 | Jensen | 251/63.6 |
| 2,710,163 | 6/1955 | Mueller et al. | 251/85 |
| 2,762,204 | 9/1956 | Hanson | 251/63.6 X |
| 2,840,337 | 6/1958 | Sasserson et al. | 251/363 X |
| 3,102,553 | 9/1963 | Ottestad | 251/63.5 X |
| 3,249,332 | 5/1966 | Hopkinson | 251/363 X |
| 3,410,518 | 11/1968 | Carsten | 251/62 |
| 3,542,332 | 11/1970 | Chevalier | 251/62 X |
| 3,558,098 | 1/1971 | Puster | 251/88 |
| 3,608,587 | 9/1971 | Zbell | 251/84 X |

FOREIGN PATENTS OR APPLICATIONS

| 1,070,464 | 12/1959 | Germany | 251/363 |
|---|---|---|---|

Primary Examiner—Henry T. Klinksiek
Attorney, Agent, or Firm—Strauch, Nolan, Neale, Nies & Kurz

[57] ABSTRACT

Apparatus for roasting particulate solids which includes a system for heating and circulating a fluid through a roasting vessel and arrangements for supplying material to be processed to and discharging it from the reactor.

8 Claims, 2 Drawing Figures

VALVES FOR ROASTING APPARATUS AND OTHER APPLICATIONS

This application is a division of application Ser. No. 301,977 filed Oct. 30, 1972 (now U.S. Pat. No. 3,763,766).

The present invention relates in one aspect to novel improved valves for use in apparatus roasting coffee beans and comparably processable solids and for other applications as well.

My copending application Ser. No. 279,748 filed Aug. 11, 1972, discloses certain novel apparatus for roasting coffee and comparably processable solids which has a number of advantages over the roasting apparatus theretofore available. In the apparatus disclosed in that application, the solids to be processed are introduced into and discharged from a reactor or roasting vessel through devices designed to prevent the egress of roasting fluid and the ingress of air so that an atmosphere of controlled composition and/or an above-atmospheric pressure can be maintained in the reactor.

As a result, the beans can be processed without oxidative degradation and, in the case of less expensive beans, under conditions which will materially upgrade their quality.

In this previously disclosed apparatus the bed is alternately incrementally advanced and halted in moving the solids from the location at which they are introduced to the location where they are removed. This permits simple, gastight locks to be employed to introduce solids into the reaction vessel and to remove roasted solids therefrom.

Valves must be provided to control the transfer of solids into and from the feed and discharge locks of the roasting apparatus and to isolate the locks from the roasting vessel and/or the ambient surroundings while the locks are being evacuated and filled with and emptied of roasting fluid. Coffee beans and the chaff generated in the roasting process are abrasive and contributed to rapid deterioration of the conventional valves first employed in association with the feed and discharge locks of the roasting apparatus disclosed in application Ser. No. 279,748 as did the roasting fluid which typically had a temperature of over 400°F. Because of their short service life, the cost of replacements, and the downtime involved in replacing them, conventional valves proved unsatisfactory from an economic point-of-view.

In an effort to solve this problem, the originally used type of valve was replaced with one still of conventional design but constructed of more wear and temperature resistant materials. While this change resulted in longer service life, the cost of such valves in the sizes required for a full-scale commercial system proved to be prohibitive.

I have now invented certain novel valves of a unique construction which, even when made from conventional valve materials, have an almost indefinite service life although continuously exposed to coffee beans and chaff and to high temperature, high velocity gases. Because conventional materials are used in these valves and because of their simplicity, they are inexpensive, even in the large sizes needed for commercial scale coffee roasting installations.

Briefly, the novel valves I have invented include a valve body with an axially aligned inlet and outlet and an internal passage providing flow communication therebetween. A replaceable valve seat is mounted in the valve body at an angle to the flow passage, which is in part formed by a central aperture through the seat.

A valve stem supporting a loosely fitted valve member biased against an abutment on the stem is movable directly toward and away from the valve seat to close and open the valve by a fluid-actuated cylinder attached to the exterior of the valve body. By virtue of the manner in which the valve member is attached to the valve stem and a knife edge projection which can be formed on either the valve seat or the valve member, a high unit and uniform contact pressure can be developed between the valve member and valve seat to provide an exceptionally tight seal therebetween. This is true even though there may be foreign matter on the valve seat or valve member as foreign substances will simply be sheared by the knife edge as the valve member is seated.

The novel method of mounting the valve member on the valve stem also insures that a uniformly tight seal is obtained in circumstances where the valve stem and valve are not exactly concentric or in precise axial alignment.

An O-ring or comparable seal is deployed between the loosely fitting valve stem and valve member. This seal keeps fluid from leaking past the stem when the valve is closed, even though the valve member may be tilted relative to the stem.

Although originally developed for the purposes discussed previously, the novel valves just described can be used in a variety of applications including those for which the superficially similar valves disclosed in U.S. Pat. Nos. 20,314 issued May 25, 1858; 1,457,318 issued June 5, 1923; 2,098,696 issued Nov. 9, 1937; 2,312,063 issued Feb. 23, 1943; 2,602,627 issued July 8, 1952; 2,666,614 issued Jan. 19, 1954; 2,720,219 issued Oct. 11, 1955; 2,829,664 issued Apr. 8, 1958; and 3,101,924 issued Aug. 27, 1963, are intended. My novel valves are especially well-suited for the handling of abrasive materials, for high temperature service, and for applications where tight seals are required.

One primary object of the present invention resides in the provision of novel, improved valves which are useful in a variety of applications and can be used to particular advantage in the coffee roasting system disclosed in parent application Ser. No. 301,977.

Still other important objects of the present invention reside in the provision of novel, improved valves which:

1. have high wear resistance in the presence of abrasive materials.
2. are suited for high temperature service.
3. are capable of providing a tight seal even though foreign matter may be present on the valve seat or the valve member.
4. are particularly well-suited to controlling the flow of solids into and from the roasting vessel in a roasting system of the character described above.

Figure 2:
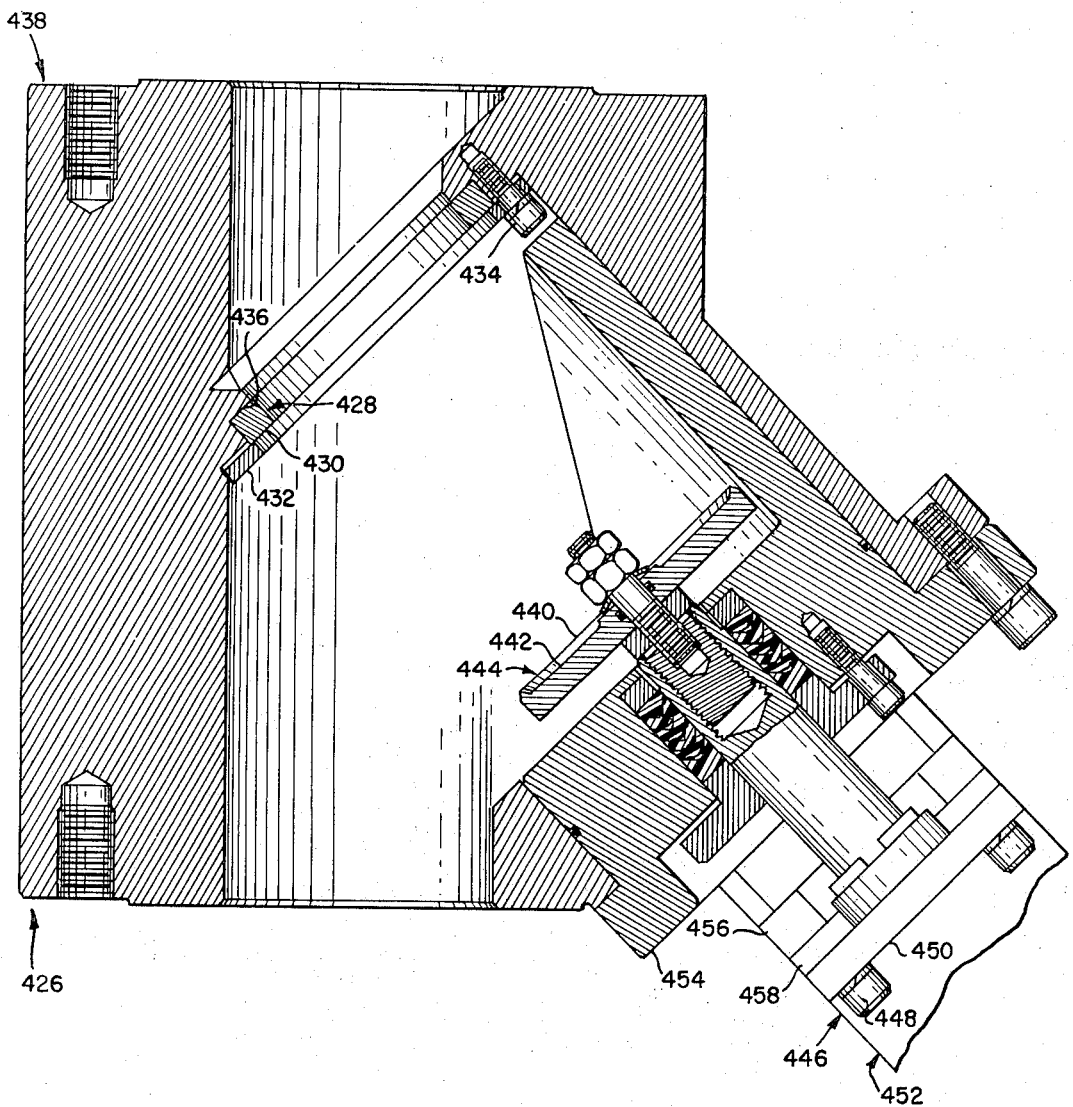

Still other important objects and features and further advantages of the invention will become apparent from the appended claims and as the ensuing detailed description and discussion proceeds in conjunction with the accompanying drawing, in which:

FIG. 1 is a section through one form of valve in accord with the principles of the present invention; and FIG. 2 is a section through a second form of valve in accord with the principles of my invention.

Referring now to FIG. 1 of the drawing, the valve therein illustrated and identified by reference character 324 numbers among its main components a generally Y-shaped valve body 326 provided with conventional mounting flanges 327. Housed in the valve body are a removable valve seat 328 and a valve member 330 supported on a valve stem 332. The valve also includes a fluid-actuated cylinder 334 for moving valve member 330 into contact with seat 328 to close the valve and away from the seat to open it.

Valve body 326 has an axially aligned inlet 336 and an outlet 337. A flow passage 338 through the valve provides fluid communication between the inlet and outlet.

Valve seat 328 surrounds flow passage 338 and is seated on an annular ledge 340 in valve body 326 with its longitudinal axis 342 inclined at an angle of approximately 40° to the axis 344 along which inlet 336 and outlet 337 are aligned.

As shown in FIG. 1, a flat, circular gasket 346 is interposed between valve seat 328 and valve body 326. This gasket keeps fluid from leaking past the valve seat when the valve is closed.

Valve seat 328 is retained in place by radially extending fasteners 348 which are threaded through valve body 326 and extend into a peripheral groove 350 in the valve seat.

In assembling the valve seat to valve body 326, gasket 346 and valve seat 328 are put in place and retained by loosely tightening retainers 348. Cylinder 334 is then actuated to move valve member 330 against and load the valve seat. This compresses gasket 346 and forms a tight seal.

Retainers 348 are then tightened. As shown in FIG. 1, the peripheral groove 350 in the seat is located further from the edge 352 of the seat facing ledge 340 than that edge 354 facing valve member 330. Accordingly, as retainers 348 are tightened, the valve seat is forced still tighter against gasket 346 to perfect the seal between the seat and valve body 326.

Referring still to the drawing, valve member 330 is of the disc type. It has a diameter exceeding that of the central aperture 356 through valve seat 328. Accordingly, when the valve member is moved against the seat to form a seal therebetween, flow through passage 338 is precluded.

Valve member 330 has a central bore 358 through which an elongated valve stem 360 extends. A clearance is provided between stem member 360 and valve member 330 so that the valve member can tilt on the order of two or three degrees relative to the stem.

An angular groove 364 opens onto the central bore 358 of the valve member. Disposed in this groove is an O-ring 366 or the equivalent. This provides a seal which keeps fluid from leaking past valve stem 332 through the bore 358 in valve member 330 when the valve is closed.

As shown in FIG. 1, stem member 360 is axially aligned with and threaded into a second valve stem member or adapter 367. One end of the valve stem adapter terminates in a radially extending abutment 368. Valve member 330 is resiliently biased against this abutment by Belleville springs 370 and 372, a washer 374, and a retainer 376 which can be threaded along valve stem member 360 to vary the force with which valve member 330 is biased against adapter 367. A second retainer 378 is threaded on stem member 360 adjacent retainer 376 to lock the latter in the position to which it is adjusted.

As shown in FIG. 1, valve stem 332 is axially aligned with the longitudinal centerline 342 of the valve seat. It is moved in a rectilinear path along this axis by fluid-actuated cylinder 334 to move valve member 330 toward and away from seat 328 in a path extending in the same direction as centerline 342.

As valve member 330 is moved toward seat 328, valve member surface 380 engages an annular knife-edge projection 382 formed on seat 328 and facing the valve member. This edge is preferably made with a small radius to keep it from being nicked or otherwise damaged. It permits high unit contact pressures to be established between the valve member and the valve seat without the exertion of excessive pressures on either component. At the same time, the valve member can tilt relative to stem 332 as necessary to make the contact pressure generally uniform over the entire area of contact.

The formation of a tight seal is important, especially in applications such as roasting system 20, as pressures of up to several hundred pounds per square inch operating in a valve unseating direction may be present. Also, because of the knife edge on the valve seat, foreign material will not keep the valve from being completely closed. Any foreign matter present on the seat or surface 380 of the valve member will simply be sheared as the valve member is moved into engagement with seat 328.

The valve arrangement just discussed also eliminates the need for close tolerances, making the valve cheap to construct. This is a feature not possessed by other high-pressure service valves. They require precision fitting which is expensive. Also, the valve member usually extends into the seat to form the seal in such valves, and this means they can be easily scratched or otherwise damaged if abrasive material is present as it would be in an installation such as system 20.

Referring again to the drawing, the adapter 367 of valve stem 332 is threaded into the free end 384 of the piston rod 386 of fluid-actuated cylinder 334. This cylinder may be of conventional construction and is mounted on valve body 326 with the axial centerline of the piston rod forming an extension of the longitudinal axis 342 of valve seat 328.

One suitable, commercially available fluid-actuated cylinder which may be employed is an Ortman-Miller Series 4L, Style B hydraulic cylinder. There are of course a number of other, commercially available equivalents which may be used instead.

As shown in FIG. 1, cylinder 334 includes, in addition to piston rod 386, a barrel 388 housing a piston 390 to which the piston rod is fixed and cylinder heads 392 and 394 with piston rod 386 extending through the latter.

Cylinder 334 is operated in conventional fashion. That is, by admitting fluid through line 396, piston 390, piston rod 386, and valve stem 332 can be moved in the direction shown by arrow 398 in FIG. 1 to move valve member 330 away from seat 328 and open the valve. Conversely, by admitting operating fluid to the cylinder through line 400, piston rod 386 and valve member 330 can be moved in the opposite direction as shown by arrow 402 to move the valve member against seat 328 and close the valve.

Referring again to the drawing, valve body 326 has an open end 404 in the vicinity of valve member 330 and fluid-actuated cylinder 334. Fitted in opening 404 is a cover 406 secured in place as by cap screws 408, which extend through the cover and are threaded into the valve body.

In the illustrated embodiment of the invention, fluid-actuated cylinder 334 is mounted on cover 406 as by headed studs 410 which extend through flanges 412 on cylinder head 394 and are threaded into the cover.

The mounting of fluid-actuated cylinder 334 on cover 406 is of considerable importance from a practical point-of-view. As will be apparent from FIG. 1, this permits the fluid-actuated cylinder, the valve stem, and the valve member to be simultaneously removed from the installation in which the valve is incorporated for servicing simply by removing retainers 408. At the same time, this also affords access to valve seat 328, which can be readily removed through opening 404 after loosening retainers 348.

Referring still to FIG. 1, communication between the interior and exterior of valve body 326 for valve stem 332 and piston rod 386 is provided by a central aperture 414 through cover 406. To keep fluid from leaking past piston rod 386 through this aperture to the exterior of the valve body, stem packing consisting of Teflon V-rings 416 is disposed in an enlarged diameter portion 418 of the bore 414 around piston rod 386. The packing is retained in place by an annular ledge 420 in cover 406 and by a conventional, cylindrical packing flange 422, which extends into recess 418 into engagement with the V-rings and is secured to cover 406 as by cap screws 424.

An O-ring or comparable seal 425 keeps fluid from leaking past the periphery of the cover to the exterior of the valve.

Referring again to the drawing, FIG. 2 illustrates a second form of valve 426 also constructed in accord with the principles of the present invention and having the advantages described previously. For the most part, this valve closely resembles the valve 324 described in detail above. Accordingly, only those components of valve 426 which differ from the corresponding components of valve 324 will be described.

In valve 426, the valve seat 428 is a ringlike member having a flat sealing surface 430 rather than a knife edge. The valve seat is retained in place by a washerlike seat retainer 432 and cap screws 434 (only one of which is shown), which press the valve seat against an annular seating ledge 436 in valve body 438.

To form a tight seal with this type of valve seat, an annular knife edge 440 with a small radius is formed on the side 442 of valve member 444 which faces valve seat 428. Knife edge 440 is dimensioned to engage the sealing surface 430 of seat 428 and provide between the seat and valve member a tight seal of the character described above.

Valve 426 also differs slightly in the manner in which the fluid-actuated cylinder 446 is supported from the valve body. In this case, cap screws 448 extending through a flange 450 on cylinder head 452 connect the fluid-actuated cylinder to cover member 454 through a pilot flange 456 and an insulator 458.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A valve comprising: a valve body having an axially aligned inlet and outlet therein; a passage in said valve body providing communication between said inlet and said outlet; a centrally apertured valve seat in said valve body between said inlet and said outlet and surrounding the passage therebetween whereby fluid must flow through the central aperture in said valve seat to reach said outlet from said inlet, said valve seat being oriented with its longitudinal axis at an angle to the axis along which the inlet and outlet are aligned; a valve stem mounted for rectilinear movement in said valve body toward and away from the valve seat along a path extending in the same direction as the longitudinal axis of the valve seat; a centrally apertured valve member mounted on said stem with the stem extending through the aperture in the valve member, said valve member being engageable with said valve seat and having a surface facing said valve seat which has an area greater than that of the aperture in said seat whereby, when said valve member is engaged with said seat, the flow of fluid through the passage between the inlet and outlet is precluded; and abutment means on said stem engageable by the side of said valve member opposite that facing the valve seat, the area of the aperture through the valve member being greater than the area of that portion of the valve stem on which said member is mounted to thereby provide a clearance between said valve member and said valve stem and said valve including means resiliently biasing said valve member against said abutment means, whereby said valve member can tilt relative to said valve stem to engage said seat with uniform pressure over the area of contact therebetween.

2. The valve of claim 1, wherein the means resiliently biasing the valve member against the abutment means on the valve stem comprises at least one spring engageable with the side of the valve member facing the valve seat, said valve member being located adjacent one end of the valve stem, said one end of said valve stem being threaded, and there being a retainer threaded on said valve stem end and movable therealong for retaining the valve member and spring thereon and for varying the pressure with which the valve member is held against the abutment means on the valve stem.

3. The valve of claim 1, wherein said valve member has an integral knife edge on the side of the member facing the valve seat, said knife edge being dimensioned to surround the central aperture in the valve seat and to engage said seat when the valve member is moved theretoward, whereby a high unit contact pressure can be developed between said valve seat and said valve member to produce a tight seal therebetween.

4. A valve comprising: a valve body having an inlet and an outlet therein; a passage in said valve body providing communication between said inlet and said outlet; a centrally apertured valve seat in said valve body between said inlet and said outlet and surrounding the passage therebetween whereby fluid must flow through the central aperture in said valve seat to reach said outlet from said inlet; a valve stem mounted for rectilinear movement in said valve body toward and away from the valve seat along a path extending in the same direction as the longitudinal axis of the valve seat; a valve member mounted on and movable with said stem, said valve member being engageable with said valve seat and having a surface facing said valve seat which has an area greater than that of the aperture in said seat whereby, when said valve member is engaged with said seat, the flow of fluid through the passage between the inlet and outlet is precluded; there being an aperture in said valve body aligned with the longitudinal axis of the valve seat and means for moving the valve stem and valve member toward and away from the valve seat comprising a fluid-actuated cylinder having a barrel, a cylinder head, and a piston rod protruding from one end of said barrel through said cylinder head and extensible and retractable relative to said barrel, said piston rod being axially aligned with and connected to said valve stem with said aperture in said valve body providing communication between the interior and exterior of the valve body for said valve stem and the piston rod of the fluid-actuated cylinder and there being means fixing the fluid-actuated cylinder to said valve body with the cylinder head of said fluid-actuated cylinder in spaced relation to said valve body.

5. The valve of claim 4, wherein said valve includes a cover member and wherein the aperture providing communication between the interior and exterior of the valve body for the valve stem and piston is formed in said cover member, said valve further including sealing means disposed in the aperture in the valve body in surrounding relationship to the piston rod of the fluid-actuated cylinder to keep fluid from leaking past said piston rod to the exterior of the valve body and a member fixed to the exterior of the cover member for keeping the sealing means in place.

6. The valve of claim 4, wherein said valve body includes a detachable cover member in which the aperture providing communication between the interior and exterior of the valve for the valve stem and piston rod is formed and wherein the means for fixing the fluid-actuated cylinder to the valve body comprises retainers extending through the head of the fluid-actuated cylinder and threaded into the cover member.

7. A valve comprising: a valve body having an inlet and an outlet therein; a passage in said valve body providing communication between said inlet and said outlet; a centrally apertured valve seat in said valve body between said inlet and said outlet and surrounding the passage therebetween whereby fluid must flow through the central aperture in said valve seat to reach said outlet from said inlet; a valve stem mounted for rectilinear movement in said valve body toward and away from the valve seat along a path extending in the same direction as the longitudinal axis of the valve seat; and a valve member mounted on said stem, said valve member being engageable with said valve seat and having a surface facing said valve seat which has an area greater than that of the aperture in said seat whereby, when said valve member is engaged with said seat, the flow of fluid through the passage between the inlet and outlet is precluded, there being a recess in said valve body providing a ledge surrounding the passage therethrough and facing the valve member and a seal seated on said ledge, said valve seat being seated on said seal, there being a peripheral groove in the valve seat nearer that edge of the seat facing the valve member than the opposite edge thereof facing said ledge, and said valve including means extending normally to the longitudinal axis of the valve seat and engaging said seat at intervals around its periphery and in said groove for biasing said seat against said seal and for retaining said seat in place.

8. A valve comprising: a valve body having an inlet and an outlet therein; a passage in said valve body providing communication between said inlet and said outlet; a centrally apertured valve seat in said valve body between said inlet and said outlet and surrounding the passage therebetween whereby fluid must flow through the central aperture in said valve seat to reach said outlet from said inlet; a valve stem mounted for movement in said valve body toward and away from the valve seat; a valve member mounted on said stem, said valve member being engageable with said valve seat and having a surface facing said valve seat which has an area greater than that of the aperture in said seat whereby, when said valve member is engaged with said seat, the flow of fluid through the passage between the inlet and outlet is precluded, there being an aperture in said valve body and means for moving the valve stem and valve member toward and away from the valve seat comprising a fluid-actuated cylinder having a barrel, a cylinder head fixed to said barrel, and a piston rod protruding from one end of said barrel through said cylinder head, said piston rod being extensible and retractable relative to said barrel and connected to said valve stem with said aperture in said valve body providing communication between the interior and exterior of the valve body for said valve stem and piston rod, and there being means fixing the fluid-actuated cylinder to said valve body.

* * * * *